United States Patent
Sakarda

(10) Patent No.: US 8,161,482 B1
(45) Date of Patent: Apr. 17, 2012

(54) POWER OPTIMIZATION FOR MULTI-CORE DEVICES

(75) Inventor: Premanand Sakarda, Acton, MA (US)

(73) Assignee: Marvell International Ltd. (BM)

( * ) Notice: Subject to any disclaimer, the term of this patent is extended or adjusted under 35 U.S.C. 154(b) by 1041 days.

(21) Appl. No.: 12/101,706

(22) Filed: Apr. 11, 2008

Related U.S. Application Data

(60) Provisional application No. 60/911,632, filed on Apr. 13, 2007.

(51) Int. Cl.
*G06F 9/46* (2006.01)

(52) U.S. Cl. .................................... 718/102; 718/104

(58) Field of Classification Search .................. None
See application file for complete search history.

(56) References Cited

U.S. PATENT DOCUMENTS

| | | | |
|---|---|---|---|
| 7,028,299 B1 * | 4/2006 | Chang | 718/104 |
| 2002/0073282 A1 * | 6/2002 | Chauvel et al. | 711/122 |
| 2004/0025161 A1 * | 2/2004 | Chauvel et al. | 718/102 |

* cited by examiner

*Primary Examiner* — Meng An
*Assistant Examiner* — Louis Diep

(57) ABSTRACT

Methods and systems for a multi-core operating system are provided. A first operating system (OS) core can manage kernel services. The first OS core may include a first memory manager and a first scheduler for scheduling a process to be executed. The process can be associated with a plurality of threads. One or more second operating system (OS) cores can share a shared memory manager and a shared scheduler, and the shared memory manager and the shared scheduler can communicate with the first memory manager and the first scheduler to facilitate offloading of one or more of a plurality of threads from the first OS core to at least one of the one or more second OS cores for execution. The first OS core can be asymmetric with respect to the one or more second operating system cores, and the one or more second operating system cores may be asymmetric with respect to each other.

29 Claims, 5 Drawing Sheets

POWER OPTIMIZATION FOR MULTI-CORE DEVICES

RELATED APPLICATION

This application claims the benefit of priority under 35 U.S.C. 119(e) from provisional application Ser. No. 60/911,632, "Multi Core Scheduler Enhancements," filed on Apr. 13, 2007, which is incorporated herein in its entirety.

TECHNICAL FIELD

This invention relates to operating system components for computer and cellular communication devices, wherein power usage is optimized through a technique for offloading the operating system context from one core to another.

BACKGROUND

Computer systems can be described as comprising three main components: user mode components, kernel mode components, and hardware. The user mode components enable, for example, user applications. Kernel mode components make up the heart of the operating system (OS), which manages all of the computer resources, such as hardware, memory, programs, task scheduling, storage management and communication handling. These can be referred to as "OS kernel services." The hardware is a physical device, such as a display, earpiece, or keyboard.

Hand-held devices, such as smart phones and pocket PCs, typically have a single processor, or core. The core is typically the processing component in the CPU that processes instructions, and the OS runs on the core. As performance demand for workload increases, the core processing speed also needs to increase. A current, exemplary speed for a mobile handset or hand-held device with the OS running on the core is 800 MHz. As the speed increases, the power consumption also increases. Since a mobile device typically has a limited power source, such as a battery, the hand-held industry is faced with tradeoffs between services, speed, and power consumption on the core running the OS.

In order to perform its functions, the OS performs processes that are transferred into the OS core's virtual memory from their storage addresses in physical memory. The processes are typically small portions of a larger application. Typical OS cores have a variety of processing methods for implementing the processes once they are within the virtual memory.

One example of an implementation method for a process involves breaking the process into one or more "threads," or sets of threads, that are associated with one or more "contexts." A "thread" is an individual part of a program that can execute independently of other parts of the program. The thread runs in a specific process, at a priority, and with a thread quantum. The thread quantum is the minimum period of time in which the thread executes. A thread is usually associated with one or more sets of instructions stored in physical locations. When the core "calls" on these threads to perform a part of the process, the core also associates the threads with a context.

The context comprises those other parts of the computer needed to complete the part of the process of the associated thread, such as data stored in the memory. The context can also mean the CPU registers, L1 cache L2 cache, processor mode, and virtual memory mapped region for the process.

A simplistic example is a process for auto-dialing a hand-held telephone. Upon indicating to the computing device within the telephone that an auto-dial telephone call is desired, such as by pushing a button, the OS core would "call" on the threads needed to auto-dial the telephone, such as a thread for connecting to the line and a thread for entering the telephone number to be called. Associated with those threads would be the context, including, for example, data for the outgoing telephone line to connect to, and data to complete the call, such as the contents of an address book or a particular telephone number.

When the OS executes threads and uses the associated context, it is said to be operating in the "OS context." When the OS has multiple threads to execute, or multiple processes to execute, the OS may switch between the processes, which requires also switching between contexts. Switching between the threads and contexts of the processes is called "context switching."

When the OS issues a command to execute a process, the command typically includes information about the context(s) and the thread(s). Typically, there are as many commands as there are threads for a particular context, but the OS can divide the process into portions, called tasks. Then, if the OS is interrupted for any reason, it does not have to repeat the process anew. Rather, the OS can begin with the interrupted task or the next task in the process.

The OS executes the tasks and generates events to represent that the tasks are complete. As the tasks are completed, the OS can aggregate the events until the whole process is complete.

Because of its designation as a "manager," a typical OS is protected from access or modification by the user mode components and by the hardware. One such protection measure uses different codes for the user and OS modes. The OS runs in kernel mode code, while the user mode has a different code. This differentiation in code allows kernel mode code to have an execution privilege that grants the OS access to system memory and all CPU instructions. It also prevents user mode code from directly accessing the hardware or other components controlled by the OS.

As a consequence of this protection measure, the OS is "compartmentalized," or segregated from other system components, and requires OS-specific components to perform scheduling and management tasks. Therefore, the OS typically has at least an associated memory manager (OSMMU) processing component and scheduler (OSSCH) processing component to implement OS kernel services.

When performing its scheduling and management tasks, the OS typically operates in "virtual mode." This mode arises after system boot, that is, initial start-up, as when the computer loads programs from the physical memory into the virtual memory of the OS. The OSMMU translates the physical addresses for stored threads and context into virtual addresses, and moves the addresses into virtual memory of the OS. The OS can then "call" to or operate on the virtual addresses without affecting the physical addresses.

During the loading process, the OSMMU creates memory maps to correlate the physical memory and the virtual memory. The memory maps include the virtual and physical addresses for the threads and the addresses for the data that makes up the contexts of the process so that, when the OS issues a virtual command to execute a process, the physical addresses of the threads and contexts can be found.

Since only the addresses are stored in the virtual memory before a command is issued, the OSMMU must translate from the virtual mode to the physical mode so that the physical addresses for the process threads and context can be accessed. The OS can then access the threads and context and, ultimately, the process can be completed.

Prior computer system designers have recognized that a large number of threads must be executed for many processes, with a concomitant storage of contexts. This creates a large burden on the OS. To assist the OS, and an OS scheduler OSSCH can schedule when the processes can be completed. The OSSCH puts threads in a "pipeline," either as individual threads or as tasks, and the threads are eventually completed. Since the number of threads can be great, and the time to complete an entire process can be long, designers have also utilized multi-core systems, such as systems with multiple processors fabricated on a single semiconductor chip, so that a computer system can have multiple compartmentalized OS cores, each operating at the kernel level.

Multi-core systems typically comprise duplicates of a main OS core, so that each core of the multi-core system has its own dedicated OS-specific components to perform the scheduling and management tasks. Therefore, each OS core of a prior art multi-core system typically has at least its own associated memory manager unit and scheduler to implement the OS kernel services.

This system-wide redundancy leads to several inefficiencies, including duplication of hardware components for the OS cores; non-communication between cores such that a first core does not know what a second core is doing, thus creating redundancy and interference; non-sharing of tasks, such that the cores operate in isolation and do not share parts of the process to be completed; and use of duplicate, high-power cores.

FIG. 1 shows an example of a traditional multi-core operating system 100 in kernel space, with user and hardware modes (details not shown). A main OS core 110 provides kernel services KS1 and comprises a memory manager unit OSMMU 1 and scheduler OSSCH 1. Other cores, 111 and 112, are provided, each with its respective memory managers, OSMMU 2 and OSMMU 3, and schedulers, OSSCH 2 and OSSCH 3. Each core 111 and 112 provides respective OS kernel services KS2 and KS3. Because security features limit access to the cores, the cores of the traditional multi-core OS 100 do not have access to each other's memory maps or to the processes stored in their virtual memory (not shown). Therefore, each core must assemble its own virtual memory, with addresses and maps, through its respective OSMMU.

In some traditional implementations, the memory map of the main OS core 110 is included in OSMMUs of the other cores. This presents a significant outlay and redundancy for memory manager unit capabilities. In addition, each core must assemble its own pipeline, P1, P2, and P3, of tasks through its respective scheduler, with each scheduler unaware of the pipeline of tasks of the other cores. This also presents significant outlay and redundancy, since the cores could execute the same tasks at the same time. Interference can result when the cores vie for the same thread or context addresses at the same time.

SUMMARY

In at least one embodiment, and consistent with the presently-claimed invention, a multi-core structure for an operating system can be provided. A first operating system core can provide kernel services, and can comprise a virtual memory for storing processes associated with the kernel services. Each process can be associated with one or more threads. A first memory manager can perform address translations for the first operating system core, wherein the address translations provide a memory map which correlates a virtual address to physical addresses of respective threads of the one or more threads stored in a first physical memory. A first scheduler can schedule processes for execution by the first operating system core. The first scheduler can further comprise a pipeline for receiving the one or more threads associated with the scheduled processes, for execution. A second operating system core comprising a second physical memory can be present. And, a second memory manager can perform address translations for the second operating system core, wherein the address translations are used to access the memory map of the first memory manager to obtain the physical addresses of the respective threads of the one or more threads stored in the first physical memory. A second scheduler can then remove one or more of the received threads from the pipeline and place the one or more of the received threads into a schedule for execution on the second operating system core. The first operating system core and the second operating system core can differ in capacity in at least one of speed, memory size, memory type, or power usage.

In some embodiments, and consistent with the presently-claimed invention, a first operating system (OS) core can manage kernel services. The first OS core may include a first memory manager and a first scheduler for scheduling a process to be executed. The process can be associated with a plurality of threads. One or more second operating system (OS) cores can share a shared memory manager and a shared scheduler, and the shared memory manager and the shared scheduler can communicate with the first memory manager and the first scheduler to facilitate offloading of one or more of a plurality of threads from the first OS core to at least one of the one or more second OS cores for execution. The first OS core can be asymmetric with respect to the one or more second operating system cores, and the one or more second operating system cores may be asymmetric with respect to each other.

In another embodiment, and consistent with the presently-claimed invention, a method for managing a multi-core operating system is provided. The method can use a first operating system (OS) core to manage kernel services, where the first OS core includes a first memory manager and a first scheduler for scheduling a process to be executed, and where the process is associated with a plurality of threads. A shared memory manager and a shared scheduler can also be shared by one or more second operating system (OS) cores in order to offload one or more of the plurality of threads from the first OS core to at least one of the one or more second OS cores for execution. The offload may be based on communication between the shared memory manager and the first memory manager and communication between the shared scheduler and the first scheduler.

It is to be understood that both the foregoing general description and the following detailed description are exemplary and explanatory only and are not restrictive of the invention, as claimed.

The accompanying drawings, which are incorporated in and constitute a part of this specification, illustrate several embodiments consistent with the invention and together with the description, serve to explain the principles of the invention.

DESCRIPTION OF THE EMBODIMENTS

Reference will now be made in detail to embodiments of the presently-claimed invention, examples of which are illustrated in the accompanying drawings. Wherever possible, the same reference numbers will be used throughout the drawings to refer to the same or like parts.

In order to provide a multi-core system to more efficiently manage kernel services, a main OS core having a dedicated OS memory manager unit and OS scheduler is provided. The main OS core contexts and threads can be mapped to multiple other cores for execution in an asymmetric manner. In order to achieve the asymmetric core structure, several components may be used, namely multiple OS cores, a multi-core memory manager unit (MCMMU) and a multi-core scheduler (MCSCH). Additionally, the system may comprise a core performance monitoring unit (Core PERF) for determining multi-core availability and performance needs, and for receiving events generated upon context execution.

Using these features, an asymmetric multi-core OS can be developed that also has selective power savings, since each core can have a different operating speed, and hence, different power consumption. Cores with less features consume less power and cores with more features consume more power. An example of core with less features is a core without a memory management unit.

Figure 1:
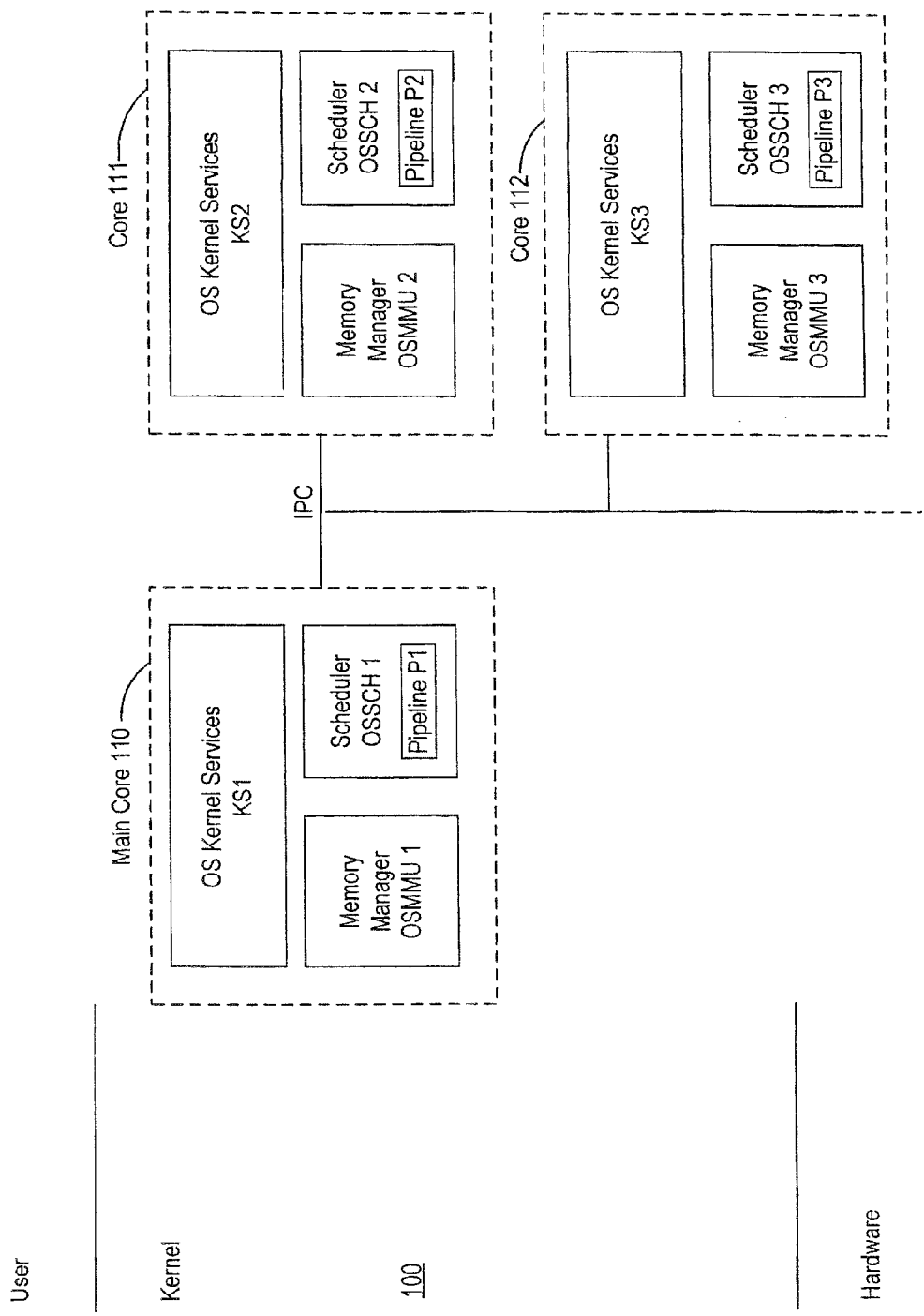
FIG. 1 is an example of a prior art multi-core operating system.
Figure 2:
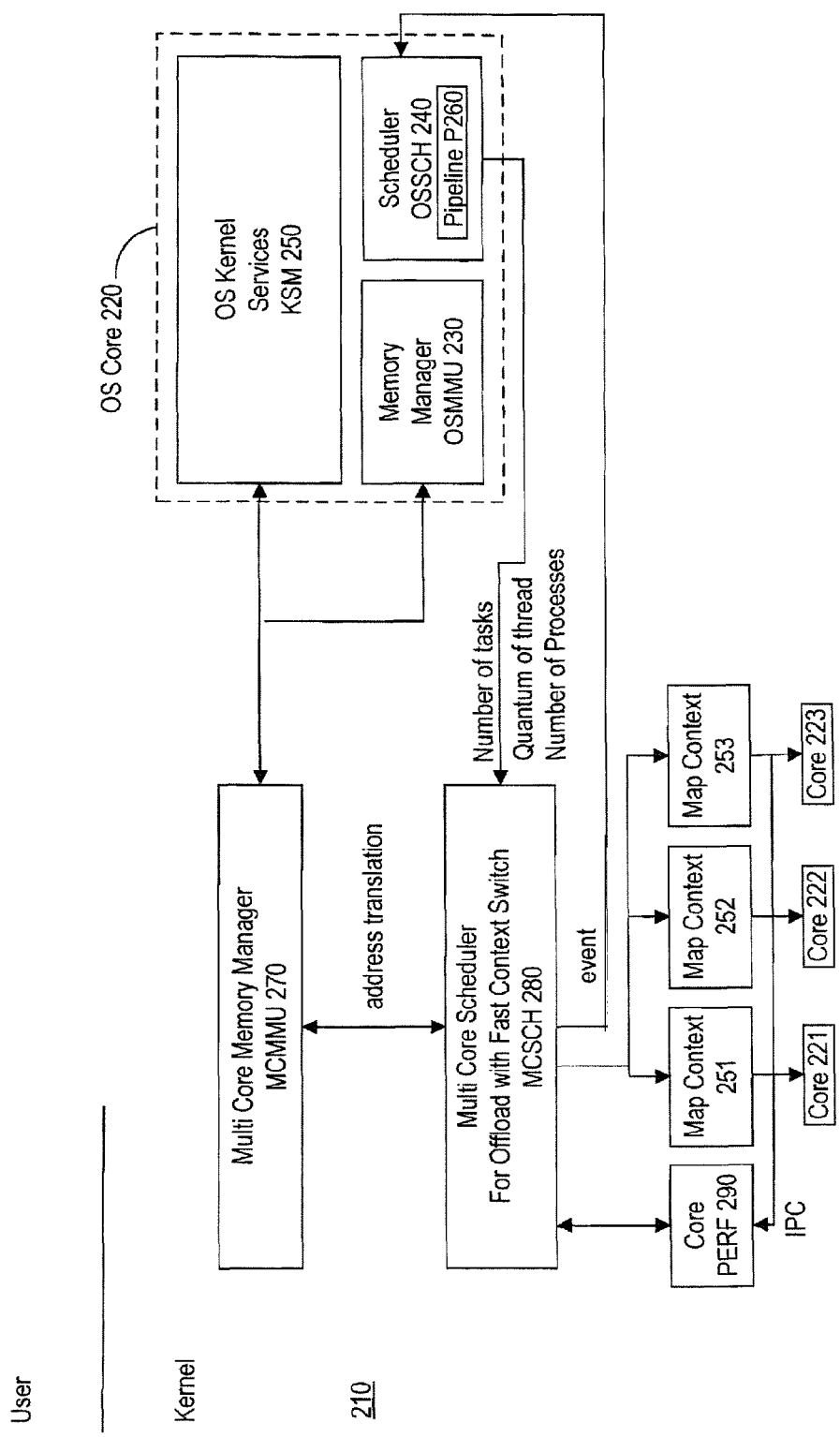
FIG. 2 is an example of a multi-core operating system with asymmetric cores.

Referring now to FIG. 2, and consistent with the presently-claimed invention, an asymmetric multi-core operating system 210 has a main OS core 220, which provides kernel services KS 250. Main OS core 220 has associated with it main memory manager unit OSMMU 230 and main scheduler OSSCH 240. Main scheduler OSSCH 240 includes a pipeline P 260. Main OS core 220 is asymmetric with respect to secondary cores 221, 222, and 223, that is, main OS core 220 is at least one of a higher operating frequency (speed), higher power demand, or higher memory capacity. For example, main OS core 220 may have a processor speed of 800 MHz, while secondary cores 221, 222, and 223 operate at lower respective speeds.

Secondary cores 221, 222, and 223 may also be asymmetric with respect to each other as to speed, power, or memory. As an example, core 221 can operate at 15 MHz, core 222 can operate at 100 MHz, and core 223 can operate at 400 MHz. Secondary cores may also have speeds that are identical to each other, such that each secondary core operates at, for example 400 MHz. In either circumstance, secondary cores 221, 222, and 223 consume less power compared to the main OS core 220, since they operate at lower speeds and may require lower power supply voltages.

Instead of each secondary core 221, 222, and 223 having its own dedicated memory manager unit, secondary cores 221, 222, and 223 share access to a common multi-core memory manager MCMMU 270. Secondary cores do not include respective memory manager units; therefore, they do not know the mapping for the virtual memory of main OS core 220, nor do they contain a mapping for their own virtual memories. MCMMU 270 also does not contain the mapping for the virtual memory of main OS core 220, but it does contain the mapping for multiple secondary cores 221, 222, and 223. Instead of duplicating the mapping of main OS core 220, MCMMU 270 accesses OSMMU 230 for mapping information. In addition to eliminating outlay and duplication of storage, this arrangement also may eliminate the burden of multiple virtual-to-physical, and physical-to-virtual address translations on OSMMU 230, since OSMMU 230 may provide physical address information to MCMMU 270. MCMMU 270, in turn, may provide the physical address information to secondary cores 221, 222, and 223 as needed with appropriate address translations completed before transfer of the context map 251, 252, and 253 to the respectively secondary cores 221, 222, and 223.

Since secondary cores 221, 222, and 223 do not each have their own dedicated memory manager units, their structure is also simplified. Secondary cores 221, 222, and 223 may also be configured so that they do not use a virtual memory; in this configuration, they would use only physical memory. This reduces the processing complexity on the individual secondary cores 221, 222, and 223 and reduces the power consumption since the secondary cores can now execute their given threads without expending resources to perform a physical-to-virtual address translation, and a later virtual-to-physical address translation.

In this way, the secondary cores 221, 222, and 223 share the MCMMU 270. The secondary cores 221, 222, and 223 also share a multi-core scheduler MCSCH 280. The MCMMU 270 and MCSCH 280 communicate with the OSMMU 230 and OSSCH 240 to initiate and/or facilitate offloading of one or more threads from the pipeline P 260 to one or more of the secondary cores 221, 222, and 223 for execution of the off-loaded threads.

In order to efficiently schedule threads for secondary cores 221, 222, and 223, the system comprises a multi-core scheduler MCSCH 280. Main core scheduler OSSCH 240 may provide any one of, or all of, three parameters to multi-core scheduler MCSCH 280: the number of tasks for main scheduler OSSCH 240; the quantum of each thread of each task scheduled for execution; and the number of processes running at any one time. The three parameters allow MCSCH 280 to determine what is in the pipeline P 260 for OSSCH 240 so that MCSCH 280 can decide which tasks it can offload from pipeline P 260 and schedule for secondary cores 221, 222, and 223.

To assist MCSCH 280 with its decision, a multi-core performance monitoring unit (Core PERF) 290 indicates to the MCSCH 280 which of the secondary cores 221, 222, or 223 is available, when it is available, and when, based on an inter-process communication (IPC), a given task is complete. The Core PERF 290 can determine whether a secondary core has a current capability to execute at least one thread from the pipeline P 260 of the main OS core 220. The Core PERF 290 is responsible for measuring available performance and current performance for different cores. The Core PERF 290 knows the secondary core capabilities (frequency, memory capacity, etc), measures instructions executed per cycle, and measures cache hit and miss rates. And, depending upon the core utilization, Core PERF 290 signals to MCSCH 280 an event completion, and also signals to MCSCH 280 the availability of the secondary core to perform additional tasks.

Based on the information from Core PERF 290, MCSCH 280 can perform context switching. That is, MCSCH 280 can indicate to OSSCH 240 that a task from the OSSCH 240 can be handed over to MCSCH 280, which will then turn the task over for execution on one or more secondary cores 221, 222, or 223. FIG. 2 indicates that this is "fast context switching," which consists of creating the context maps 251, 252, and 253 for the secondary cores 221, 222, or 223. Creating the context maps 251, 252, and 253 for the secondary cores includes configuring the CPU registers, configuring the virtual memory region with a translation lookaside buffer, and configuring the caches. MCSCH 280 can get context information from MCMMU 270. MCSCH 280 can then map the context to each of the secondary cores so that appropriate threads can run on each of the cores through the fast context switching.

MCSCH 280 assigns a thread or task and then maps a context to a designated secondary core, which executes the thread or task. When the thread or task is completed, the designated secondary core generates an event and notifies Core PERF 290 that the thread or task is complete. Core PERF 290 can then indicate that the secondary core is available to offload another thread or task. In addition, MCSCH 280 notifies OSSCH 240 of the event completion and transfers the event to main OS core 220 for use.

Figure 3:
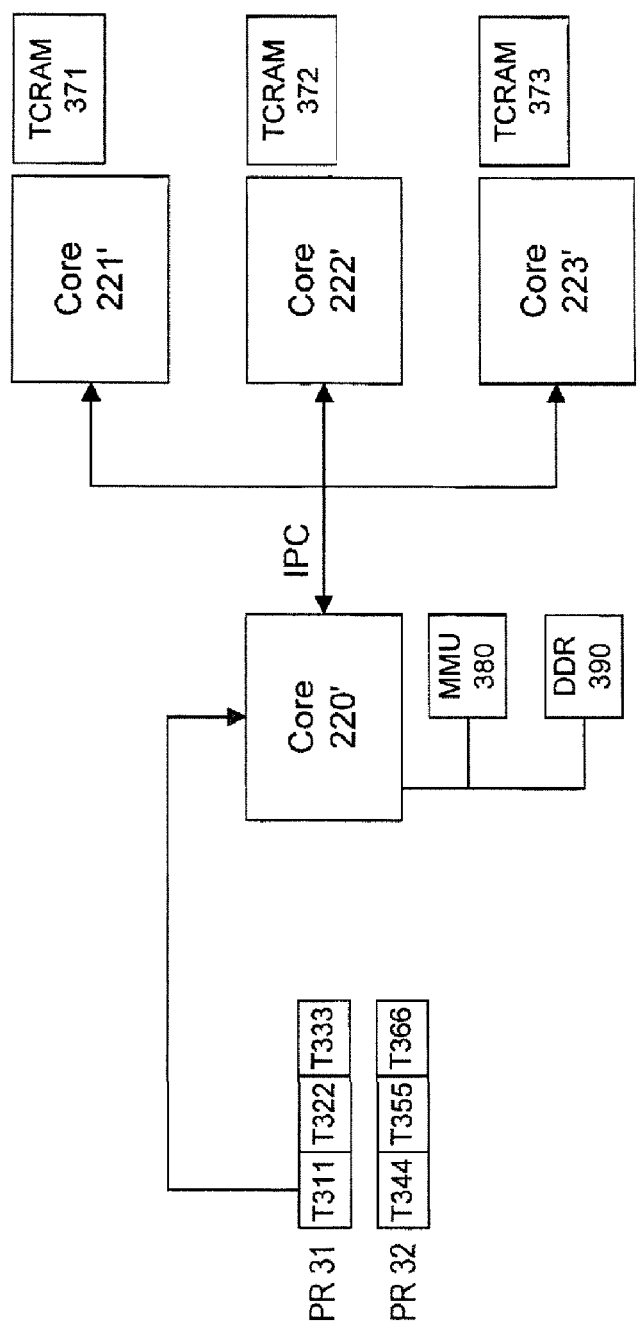
FIG. 3 is an example of a multi-core operating system with process and thread sharing between asymmetric cores.

Turning to FIG. 3, an example having two processes PR 31 and PR 32 is shown. For clarity, portions of the exemplary system of FIG. 2 are not shown in FIG. 3, and like parts are similarly labeled. Each process PR 31 and PR 32 has, for example, three respective threads T 311, T 322, T 333, T 344, T 355, and T 366. In this example, the threads use a quantum of 100 ms to execute. Since the main OS core 220' has chosen to execute the processes PR 31 and PR 32, the threads T 311, T 322, T 333, T 344, T 355, and T 366 are also executed. In response to a command from the main OS core 220', he threads T 311, T 322, T 333, T 344, T 355, and T 366 are transferred into main OS core 220'. As shown in FIG. 2, a multi-core scheduler determines if the threads T 311, T 322, T 333, T 344, T 355, and T 366 can be offloaded from the main OS core 220' to any one of the secondary cores 221', 222', or 223', based on a number of factors, such as the size of the process, including the number of contexts and threads, and/or the time sensitive nature of the process. Also as shown in FIG. 2, the multi-core scheduler receives information from the multi-core performance monitoring unit. If offloading is appropriate, the threads T 311, T 322, T 333, T 344, T 355, and T 366 and associated contexts are mapped to chosen one(s) of the secondary cores 221', 222', and 223' for execution through an inter-process communication (IPC) based upon the capacity of the secondary cores to execute the threads.

As an example, with the OS running from the DDR (double data rate random access memory) 390, secondary core 221' may be busy executing instructions for its specific device, and so no thread is mapped to it. Secondary core 222' may be of such small capacity that only T 311 and T 322 can be mapped to it. Secondary core 223' may be large enough to accommodate the remaining threads, and so T 333, T 344, T 355, and T 366 are mapped to it for execution. Each of the secondary cores 221', 222', and 223' are associated with its own tightly-coupled random access memory TCRAM 371, TCRAM 372, and TCRAM 373 for fast access to memory. In this way, memory manager unit MMU 380 can be specific to main OS core 220', while the secondary cores 221', 222', and 223' do not have memory manager units, but instead have TCRAM 371, TCRAM 372, and TCRAM 373. With threads T 311, T 322, T 333, T 344, T 355, and T 366 mapped in this fashion, and using the above exemplary speed distribution of 150 MHz, 100 MHz, and 400 MHz for secondary cores 221', 222', and 223', a device having this multi-core system is able to execute threads at a lower power consumption than if the main OS core 220' had executed the threads at the speed of 800 MHz. From at least a power consumption standpoint, this allows a device to manage services more efficiently than a traditional multi-core OS. This is particularly advantageous for mobile or hand-held devices, where battery life is an important factor.

An additional advantage of this outlay stems from the dual purpose of secondary cores 221', 222', and 223'. Secondary cores 221', 222', and 223' can be installed in the system for the purpose of supporting other specific devices, but instead of being dedicated solely to those devices, a portion(s) of the main OS context can execute on secondary cores 221', 222', and 223' while other portion(s) of the main OS context can execute on main OS core 220'. Therefore, if one of the secondary cores 221', 222', and 223' is not being used by its specific device, main OS context can be offloaded to an available secondary core.

Since a device-specific core can be scaled in capability to support the particular device, an asymmetric multi-core system consistent with the invention may adapt to accommodate the particular capabilities of device-specific cores added to the system by appropriately scaling the processes scheduled to the device-specific cores. In this way, cost savings are achieved, since the outlay of new cores can be limited to when a new device is added to the system. In this situation, additional outlay savings are achieved, since the core can be appropriately scaled to the added device.

As an alternative to device-specific additions, scaling of additions can be based upon other factors, such as the offering of a new service. The new core's capacity could then be sufficient for the new service.

To implement the advantages of a multi-core system in a traditional single core system, scheduler OSSCH enhancements can be implemented to include new cores. The scheduler enhancements would assist with the implementation of the method of FIG. 4. In this way, the original OS can remain, and there is no need to replace the originally installed OS. The multi-core system can then be installed with a software upgrade to the main OS core scheduler and the addition of new hardware.

Figure 4:
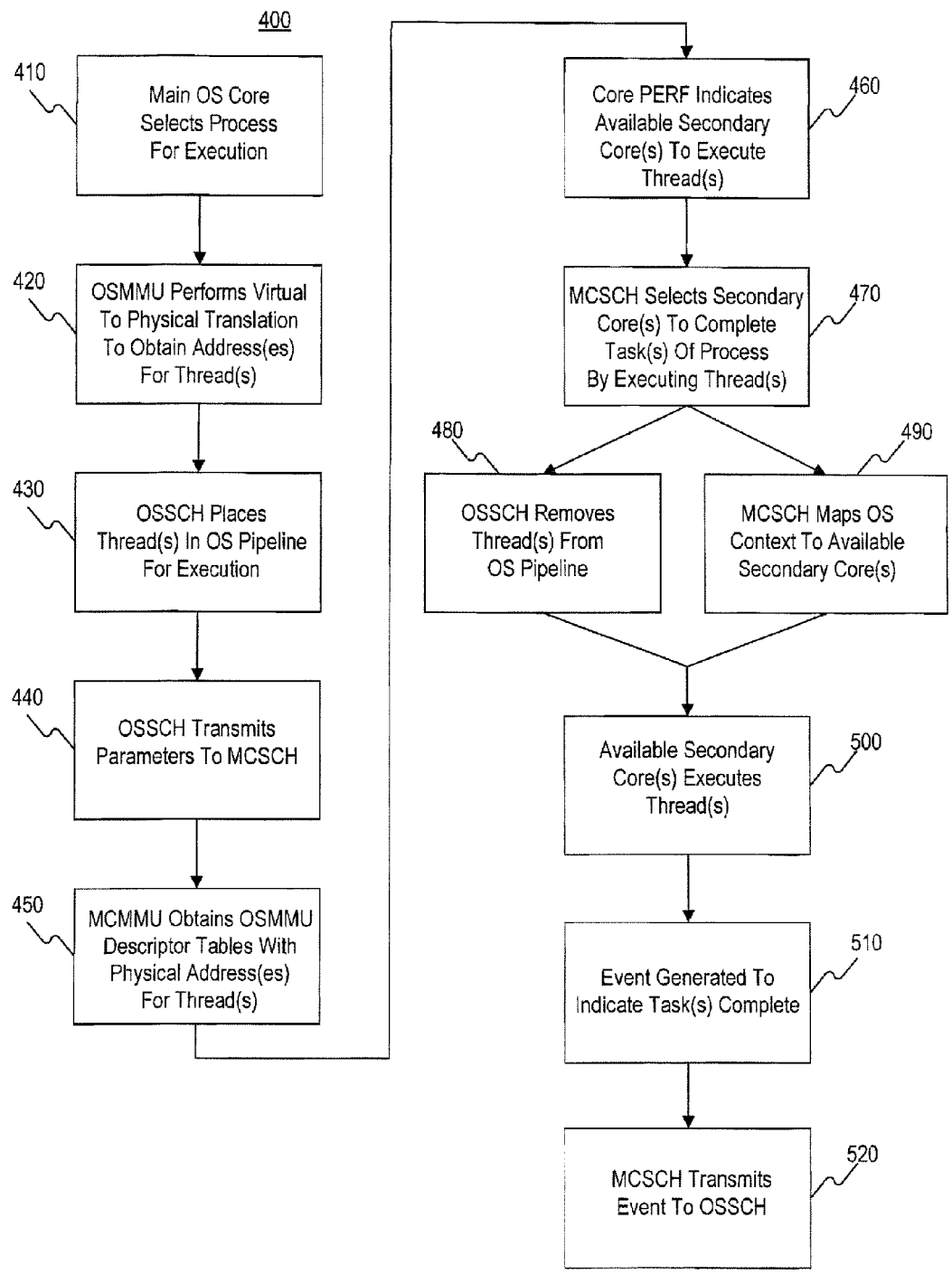
FIG. 4 is an exemplary method of task sharing in a multi-core operating system environment.

FIG. 4 shows a method for task sharing in a multi-core operating system. Method 400 begins with the main OS core selecting a process for execution at step 410. The process may be for the implementation of any one or more typical OS kernel services, such as processes to manage all of the computer resources, including, for example, hardware, memory, programs, task scheduling, storage, or communication handling.

At step 420, an OS memory manager unit (OSMMU) assists the OS core with the execution of the process to be implemented by performing a virtual-to-physical address translation to obtain any addresses needed for threads and context stored in the physical memory. Upon obtaining the addresses for the threads and context, the system loads the address data, threads, and context into the core for execution, so that the process can be implemented. The threads are grouped into tasks, then at step 430, OS scheduler (OSSCH) schedules the tasks for execution, by placing the threads of the tasks in an OS pipeline. The threads can then be executed in the order that they appear in the pipeline.

At step 440, in order to offload some of the tasks, OSSCH transmits parameters to a multi-core scheduler (MCSCH). Three exemplary parameters may comprise: the number of tasks on OSSCH pipeline, the quantum of each thread of the tasks, and the number of processes available for execution. The MCSCH can then provide a fast context switch to offload the tasks and associated context from the main OS core onto one of the secondary cores.

At step 450, a multi-core memory manager unit (MCMMU) assists with the offloading by obtaining the OSMMU descriptor tables and memory maps of the physical addresses of any threads to be executed. The MCMMU performs any virtual-to-physical, or physical-to-virtual address translations needed for the secondary cores. Once the MCMMU has arranged for the appropriate thread addresses, at step 460, a core performance monitoring unit (Core PERF) indicates which secondary cores are available to execute the threads of a given context. At step 470, MCSCH selects and schedules secondary cores to complete the tasks using the inputs from Core PERF. At step 480, MCSCH tells the OSSCH which threads can be removed from the OS pipeline. At step 490, MCSCH maps the contexts to the appropriate secondary cores by accessing a lookup table in the MCMMU containing the contexts.

The secondary cores then execute the threads mapped to them at step 500. At step 510, once the threads associated with given task(s) are executed, the secondary cores generate event(s) to indicate that the given task(s) have been completely executed. The core PERF monitors the secondary cores to track the completion through an IPC. Core PERF also notifies the MCSCH of completion, and, at step 520, the MCSCH transmits information associated with the event(s) back to the OSSCH for use by main OS core.

Figure 5:
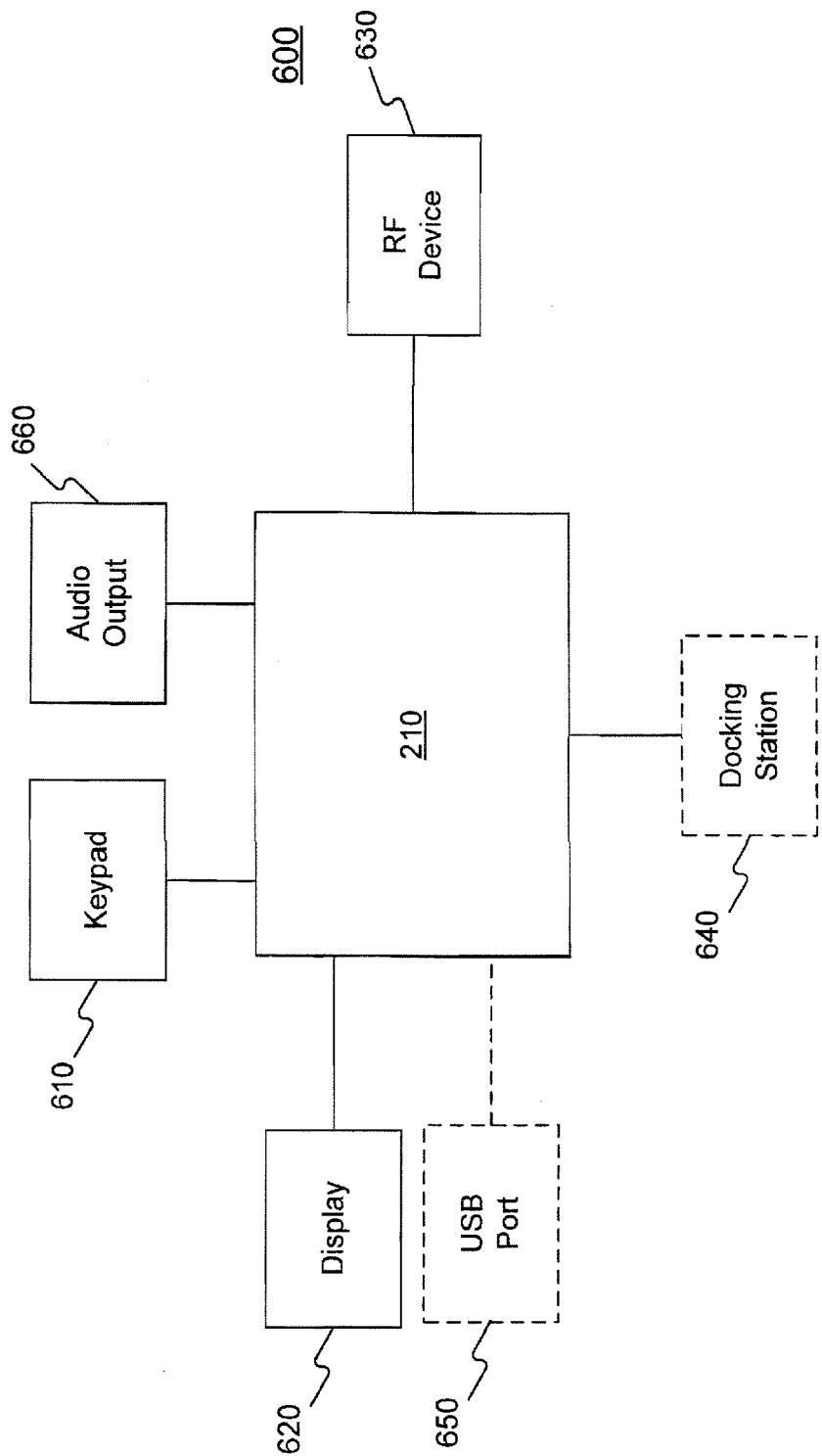
FIG. 5 is an exemplary mobile device incorporating the system of FIG. 3 or 4.

As shown in FIG. 5, multi-core operating system 210 of FIG. 2 may be incorporated into a mobile device, such as a cellular phone 600. In the alternative, the system of FIG. 3 may be incorporated into the cellular phone 600. The cellular phone 600 may comprise auxiliary components such as a keypad 610, display 620, RF device 630, and audio output 660. As shown by the dashed boxes, a docking station 640 and/or USB (universal serial bus) port 650 may also be a part of cellular phone 600. The docking station 640 and USB port 650 may have associated with them secondary cores that could be accessed by, and functionally incorporated into, a multi-core operating system, such as system 210. In this exemplary way, a device-specific secondary core may be added to the system for communication with MCSCH 280 and, through an IPC, with Core PERF 290. Other methods are available to add secondary cores to the multi-core operating system 210, such as, by manual or mechanized installation within the cellular phone 600.

Other embodiments of the invention will be apparent to those skilled in the art from consideration of the specification and practice of the invention disclosed herein. For instance, a process can comprise only one task, which needs only one thread to be executed for completion. Or, any number of threads or contexts can be required to complete a process. Also, while three secondary cores have been shown and described, any number of secondary cores can be used, including only a single secondary core.

In addition, though user, kernel, and hardware spaces have been generally described, those skilled in the art would understand the components of an operating system to implement the kernel space, and would understand the customary components of the user and hardware spaces. The features of a processor and memory, and instructions to implement the methods disclosed, would also be apparent to one skilled in the art.

By way of non-limiting example, and consistent with the disclosure, the systems and methods described may be implemented using a single machine or a system of communicatively coupled machines or devices operating together. In addition to the cellular phone 600 shown above, exemplary systems may include, without limitation, distributed computing systems, supercomputers, computing clusters, mainframe computers, mini-computers, client-server systems, personal computers, workstations, servers, portable computers, laptop computers, tablet processing systems, telephones, PDAs, PNDs, handheld devices, mobile handsets, entertainment devices such as audio and/or video devices, and other devices for processing or transmitting information. A system consistent with the disclosure can include, among other things, applications, interfaces, memories, and one or more processors.

The components of the system may be communicatively coupled to various other components via one or more buses or other communication conduits or pathways. Components of the system may comprise, for example, an integrated circuit (IC) and/or a System on a Chip (SoC). The components coupled to a processor may include one or more volatile or non-volatile data storage devices, such as RAM and/or ROM. A memory bus may serve to couple the RAM and the ROM with a processor. A processor may also be communicatively coupled to mass storage devices, such as one or more integrated drive electronics (IDE) drives, small computer systems interface (SCSI) drives, or other types of hard disk drives. Other types of mass storage devices and storage media usable by a processing system may include floppy disks, tapes, memory sticks, digital video disks, or other tangible computer readable media. Applications and their associated instructions, using various programming languages, can be stored on the storage media.

The components communicatively coupled to a processor may also include one or more bus bridges, either directly or indirectly, with additional components, such as one or more storage devices, device controllers, input/output (I/O) ports, and interfaces. For example, the additional components may include a video controller, a SCSI controller, a network controller, a universal serial bus (USB) controller, a keyboard controller, etc. In some embodiments, such components may be implemented as embedded devices, using components such as programmable or non-programmable logic devices or arrays, application-specific integrated circuits (ASICs), embedded computers, smart cards, and the like.

Hardware associated with the operating system may comprise conventional input devices, such as a keyboard, keypad, pointing device, or the like, and/or one or more remote data processing systems, and may comprise conventional output devices, such as a display device, a remote data processing system, or equivalents.

It is intended that the specification and examples be considered as exemplary only, with a true scope and spirit of the invention being indicated by the following claims.

What is claimed is:

1. A multi-core structure for an operating system, comprising:

a first operating system (OS) core for providing kernel services, the first OS core comprising a first physical memory for storing one or more threads and a virtual memory for storing processes associated with the kernel services, wherein the processes are associated with the threads;

a first memory manager for performing first address translations for the first OS core, wherein the first address translations provide a memory map which correlates a virtual address to physical addresses of the threads stored in the first physical memory;

a first scheduler for scheduling processes for execution by the first OS core, the first scheduler further comprising a pipeline for receiving the threads that are associated with the scheduled processes for execution;

a second OS core comprising a second physical memory;

a second memory manager for performing second address translations for the second OS core, wherein the second address translations are used to access the memory map of the first memory manager to obtain the physical addresses of the threads stored in the first physical memory;

a second scheduler for removing one or more of the received threads from the pipeline and for placing the removed threads into a schedule for execution on the second OS core; and a third OS core comprising a third physical memory, wherein the second memory manager provides the third OS core with physical addresses for use by the third OS core to access the threads stored in the first physical memory, and wherein the second scheduler removes one or more of the received threads from the pipeline and places the removed threads into a schedule for execution on the third OS core.

2. The structure of claim 1, further comprising a core performance monitoring unit for determining whether the second OS core has a current capability to execute at least one of the received threads.

3. The structure of claim 1, wherein the first OS core and the second OS core differ in capacity in at least one of speed, memory size, memory type, or power usage.

4. The structure of claim 1, wherein the first OS core, the second OS core, and the third OS core differ in capacity in at least one of speed, memory size, memory type, or power usage.

5. The structure of claim 1, wherein:
the first OS core differs in capacity from the second OS core and the third OS core in at least one of speed, memory size, memory type, or power usage; and
the second OS core and the third OS core are equal in capacity in at least one of speed, memory size, memory type, or power usage.

6. The multi-core structure of claim 1, wherein the multi-core structure is embodied in a mobile device.

7. An apparatus comprising:
a first operating system (OS) core for managing kernel services, the first OS core including a first memory manager and a first scheduler for scheduling a process to be executed, wherein the process is associated with a plurality of threads;
at least two second OS cores;
at least one non-transitory computer-readable medium storing processor executable instructions that implement a shared memory manager, and a shared scheduler;
wherein the shared memory manager and the shared scheduler are shared by the at least two second OS cores;
wherein the shared memory manager and the shared scheduler communicate with the first memory manager and the first scheduler, respectively, to initiate offloading of one or more of the threads from the first OS core to at least one of the at least two second OS cores for execution;
wherein the first operating system core comprises a first physical memory;
wherein the at least two second OS cores include a second OS core comprising a second physical memory and a third OS core comprising a third physical memory; and
wherein the shared memory manager is configured to provide the third OS core with physical addresses for use by the third OS core to access the threads stored in the first physical memory, and wherein the shared scheduler removes one or more of the received threads from a pipeline and places the removed threads into a schedule for execution on the third OS core.

8. The apparatus of claim 7 further comprising a performance monitoring unit for determining which one of the second OS cores is to receive and execute one or more offloaded threads.

9. The apparatus of claim 7 wherein the first memory manager and the shared memory manager exchange information related to address translations.

10. The apparatus of claim 7 wherein:
the first scheduler and the shared scheduler exchange at least one of a plurality of parameters; and
the shared scheduler uses the at least one of the plurality of parameters to determine which of the threads can be offloaded from the first OS core to at least one of the second OS cores.

11. The apparatus of claim 10, wherein the plurality of parameters include at least one of:
a number of tasks executing on the first OS core;
information related to a quantum of at least one of the threads; or
a number of processes executing on the first OS core.

12. The apparatus of claim 7 wherein the first OS core is asymmetric with respect to the second OS cores.

13. The apparatus of claim 12 wherein at least two of the second OS cores are asymmetric with respect to one another.

14. The apparatus of claim 12 wherein the first OS core is asymmetric with respect to the second OS cores in terms of at least one of speed, memory size, memory type, or power usage.

15. The apparatus of claim 7 wherein the shared scheduler is configured to provide context information to at least one of the second OS cores to allow the at least one second OS core to execute one or more offloaded threads.

16. The apparatus of claim 7 wherein the shared scheduler is configured to provide event information to the first scheduler in response to completion of execution of one or more offloaded threads.

17. The apparatus of claim 7, wherein the apparatus is a mobile device.

18. A method for managing a multi-core operating system, the method comprising:
using a first operating system (OS) core to manage kernel services, the first OS core including a first memory manager and a first scheduler for scheduling a process to be executed, wherein the process is associated with a plurality of threads;
sharing a shared memory manager and a shared scheduler between at least two second OS cores;
offloading one or more of the threads from the first OS core to at least one of the second OS cores for execution, using information communicated between the shared memory manager and the first memory manager and information communicated between the shared scheduler and the first scheduler;
wherein the first operating system core comprises with a first physical memory;
wherein the at least two second OS cores include a second OS core comprising a second physical memory and a third OS core comprising a third physical memory; and
wherein the method includes providing the third OS core with physical addresses for use by the third OS core to access the threads stored in the first physical memory, and removing one or more of the received threads from a pipeline and placing the removed threads into a schedule for execution on the third OS core.

19. The method of claim 18 further comprising determining which of the second OS cores is to receive and execute the offloaded threads.

20. The method of claim 18 further comprising exchanging information related to address translations between the first memory manager and the shared memory manager.

21. The method of claim 20 wherein the information related to address translations comprises mapping information between virtual memory addresses and physical memory addresses associated with the plurality of threads.

22. The method of claim 18 further comprising determining which one or more of the threads can be offloaded from the first OS core to at least one of the second OS cores based on at least one of a plurality of parameters exchanged between the first scheduler and the shared scheduler.

23. The method of claim 22 wherein the plurality of parameters include:
   at least one of a number of tasks executing on the first OS core;
   information related to a quantum of at least one of the threads; or
   a number of processes executing on the first OS core.

24. The method of claim 18 wherein the first OS core is asymmetric with respect to the second OS cores.

25. The method of claim 24 wherein at least two of the second OS cores are asymmetric with respect to one another.

26. The method of claim 24 wherein the first OS core is asymmetric with respect to the second OS cores in terms of at least one of speed, memory size, memory type, or power usage.

27. The method of claim 18 further comprising providing context information from the shared scheduler to at least one second OS core to allow the at least one second OS core to execute the offloaded threads.

28. The method of claim 18 further comprising providing event information from the shared scheduler to the first scheduler in response to completion of execution of the offloaded threads.

29. The method of claim 18, wherein the method is embodied on at least one non-transitory computer-readable medium storing processor executable instructions in a mobile device.

* * * * *